(12) United States Patent
Graybill

(10) Patent No.: US 12,473,137 B2
(45) Date of Patent: Nov. 18, 2025

(54) SPLIT COMPARTMENT INSULATED CONTAINER ASSEMBLY

(71) Applicant: Dual Drinks LLC, Orlando, FL (US)

(72) Inventor: Sidney J. Graybill, Orlando, FL (US)

(73) Assignee: Dual Drinks LLC, Orlando, FL (US)

( * ) Notice: Subject to any disclaimer, the term of this patent is extended or adjusted under 35 U.S.C. 154(b) by 0 days.

(21) Appl. No.: 18/659,444

(22) Filed: May 9, 2024

(65) Prior Publication Data
US 2024/0375845 A1  Nov. 14, 2024

Related U.S. Application Data

(60) Provisional application No. 63/500,969, filed on May 9, 2023.

(51) Int. Cl.
| | | |
|---|---|---|
| *B65D 1/04* | (2006.01) | |
| *A47G 19/12* | (2006.01) | |
| *A47J 43/27* | (2006.01) | |
| *B65D 43/02* | (2006.01) | |
| *B65D 47/12* | (2006.01) | |
| *B65D 65/38* | (2006.01) | |

(Continued)

(52) U.S. Cl.
CPC ....... *B65D 81/3865* (2013.01); *A47G 19/127* (2013.01); *A47J 43/27* (2013.01); *B65D 43/0225* (2013.01); *B65D 47/12* (2013.01); *B65D 65/38* (2013.01); *B65D 81/32* (2013.01); *A47G 2019/122* (2013.01); *B65D 2203/04* (2013.01); *B65D 2217/00* (2013.01); *B65D 2543/00046* (2013.01); *B65D 2543/00092* (2013.01); *B65D 2565/384* (2013.01)

(58) Field of Classification Search
CPC ............ B65D 81/3865; B65D 81/3283; B65D 81/32; B65D 25/04; B65D 1/24; B65D 2203/04; B65D 2217/00; B65D 43/0225; B65D 47/12; B65D 65/38; B65D 2543/00043; B65D 2543/00092; B65D 2565/384; A47G 19/127; A47G 2019/122; A47J 43/27
USPC ....... 220/592.17, 553, 522, 525, 555; 215/6, 215/313, 387
See application file for complete search history.

(56) References Cited

U.S. PATENT DOCUMENTS

| | | | | |
|---|---|---|---|---|
| 1,568,160 A | * | 1/1926 | Hibbert ................. | A47G 19/24 |
| | | | | 222/142.3 |
| 5,392,947 A | * | 2/1995 | Gentile .............. | B65D 47/0804 |
| | | | | 424/44 |

(Continued)

*Primary Examiner* — Don M Anderson
*Assistant Examiner* — Elizabeth J Volz
(74) *Attorney, Agent, or Firm* — Jenei LLC

(57) ABSTRACT

A container assembly for storing multiple liquids is disclosed. The container assembly comprises a container body having a first compartment and a second compartment. Each compartment comprises an upper end, an opening at the upper end, and a lower end. The container assembly further comprises an insulator provided between the first compartment and the second compartment configured to separate both compartments, thereby allowing the container body to store multiple liquids simultaneously. Further, the container assembly further comprises a rotatable lid detachably attached to the upper end of the container body configured to prevent and stop any leakage, wherein the rotatable lid is activated to set the amount of liquid to be dispensed from each compartment.

20 Claims, 14 Drawing Sheets

(51) Int. Cl.
   *B65D 81/32* (2006.01)
   *B65D 81/38* (2006.01)

(56) References Cited

U.S. PATENT DOCUMENTS

| | | |
|---|---|---|
| 6,584,800 B1 | 7/2003 | Roth et al. |
| 8,051,996 B1 * | 11/2011 | Amaya .................. A61J 9/008 |
| | | 215/11.1 |
| 8,800,817 B2 | 8/2014 | Norris et al. |
| 9,266,667 B2 | 2/2016 | Guoqing et al. |
| 9,834,363 B2 * | 12/2017 | De Cleir ................ B65D 35/22 |
| 10,582,786 B1 * | 3/2020 | Saint Geours ....... B65D 47/265 |
| 10,583,786 B1 * | 3/2020 | Green ................... B60R 9/0423 |
| 10,583,951 B2 | 3/2020 | Farahani |
| 11,524,833 B2 | 12/2022 | Tolman et al. |
| 11,986,108 B1 * | 5/2024 | Rixter ................. B65D 45/325 |
| 2002/0151410 A1 * | 10/2002 | Boardman ............ B60W 10/06 |
| | | 477/181 |
| 2006/0021996 A1 | 2/2006 | Scott, III et al. |
| 2012/0018343 A1 * | 1/2012 | Carland .................... A45F 3/18 |
| | | 220/660 |
| 2015/0144516 A1 | 5/2015 | Shamoon et al. |
| 2016/0200474 A1 | 7/2016 | Burden |
| 2017/0349354 A1 | 12/2017 | Garg |
| 2018/0249863 A1 | 9/2018 | Moksin et al. |
| 2021/0007547 A1 | 1/2021 | Moksin et al. |
| 2021/0030176 A1 | 2/2021 | Burden |
| 2022/0151410 A1 * | 5/2022 | Trammell .......... A47G 19/2205 |

* cited by examiner

SPLIT COMPARTMENT INSULATED CONTAINER ASSEMBLY

CROSS-REFERENCE TO RELATED APPLICATIONS

The present Application claims the benefit of U.S. Provisional Application Ser. No. 63/500,969 entitled "SPLIT COMPARTMENT INSULATED CONTAINER ASSEMBLY" filed May 9, 2023, which is hereby expressly incorporated by reference herein to form part of the present disclosure.

TECHNICAL FIELD

The present invention generally relates to containers for holding liquids. More specifically, the present invention relates to a container having multiple insulated compartments for holding multiple liquids simultaneously. In addition, the invention encompasses a specialized lid mechanism designed to facilitate the mixing of two or more liquids. This lid incorporates a user-controlled mechanism enabling individuals to adjust the output percentage of each liquid, thereby providing customizable mixing options tailored to user preferences.

BACKGROUND OF THE INVENTION

There are numerous types of liquid containers such as bottles, cans, and plastic containers. Reusable drinking bottles are being used with increasing frequency, due in part to the public's increased awareness about the negative environmental impact of disposable drinking bottles.

Reusable drinking bottles are commonly made from a hard plastic material or stainless steel and are often sized to hold several servings of a drinkable liquid, for example, water.

Generally, modern beverage containers come in various forms and sizes, and are made of various materials to maintain liquid in such liquid containers at a particular temperature to avoid various health hazards. For example, soda containers are typically made of plastic and formed using a blow mold process, having a single pouring spout, intended for holding a single beverage. These containers have several advantages over prior containers as they can be produced very inexpensively, and therefore can be disposable. However, the existing reusable containers can hold only one beverage at a time.

Thus, there is a need for a container configured to retain multiple drinkable beverages or foods at a same time, or simultaneously. Also, there is a need for a container that is split into dual compartments to permit dual beverage consumption at one time.

SUMMARY OF THE INVENTION

The present invention generally discloses a drinkware container for retaining multiple beverages simultaneously. The present disclosure pertains to a multipurpose improved multi-chambered container. The separate chambers can be used for storing different contents at the same or different temperatures.

In one embodiment, the drinkware container may include a container body and a user-controlled container closure. In one embodiment, the container body includes two or more interior chambers and a body portion. In one embodiment, the body portion may include a plurality of interior walls and an exterior wall disposed around the plurality of interior walls. In one embodiment, the plurality of interior walls forms a plurality of chambers within the body portion. In one embodiment, the closure portion may include a plurality of openings corresponding to the plurality of chambers. In one embodiment, the plurality of openings leads into the plurality of chambers corresponding to the plurality of openings. In one embodiment, each of the plurality of interior walls may be thermally isolated from the plurality of interior walls and the exterior wall. In one embodiment, the plurality of chambers may be configured for storing a plurality of substances in the plurality of chambers received through the plurality of openings. In one embodiment, the plurality of interior walls and the exterior wall thermally isolate each of the plurality of substances stored in each of the plurality of chambers from the plurality of substances stored in the plurality of chambers and an exterior of the body portion for retaining a temperature of each of the plurality of substances. In one embodiment, each of the plurality of interior walls may be spaced from the plurality of interior walls and the exterior wall defining a space around an exterior of each of the plurality of chambers. In one embodiment, each of the plurality of interior walls may be thermally isolated from the plurality of interior walls and the exterior wall based on the space around the exterior of each of the plurality of chambers. In one embodiment, the container closure may be configured to be coupled with the top portion of the container body. In one embodiment, the container closure may include a plurality of closure openings. In one embodiment, the plurality of closure openings couples with the plurality of openings based on the coupling of the container closure with the body portion. In one embodiment, the container closure may be configured for allowing an independent retrieval of the plurality of substances from the plurality of chambers through the plurality of closure openings.

In one embodiment, the two or more separate chambers are thermally isolated from each other and may have an insulation barrier or space between them such as a vacuum space. This space acts as a thermal barrier and prevents heat transfer between the chambers to allow them to remain at different temperatures. Therefore, the drinkware container could be used for carrying both hot and cold contents at the same time. In one embodiment, the present invention discloses a container assembly with closure that incorporates a user-controlled mechanism enabling individuals to adjust the output of each liquid. Also, the present invention discloses a container assembly with multiple insulated compartments to permit multiple beverage consumption at one time. For example, a container assembly with two insulated compartments may permit two beverage consumption at one time and the user-controlled mechanism can adjust the output percentage of each liquid, thereby providing customizable mixing options tailored to user preferences such as 50:50, 40:60, 30:70, and so forth.

In one embodiment, the container assembly is an innovative and intelligent dual thermos or drinkware bottle that has been designed to store multiple liquids such as drinkable beverages or foods. The multiple liquids are separately stored in the container assembly simultaneously. In one embodiment, the container assembly has the capability to contain both hot and cold liquids simultaneously. In one embodiment, the container assembly has the capability to contain both non-alcoholic and alcoholic beverages simultaneously. In one embodiment, the container may be reusable, and may comprise materials such as stainless steel, glass, ceramic, aluminum, iron, wood, silver, copper, acrylic, nylon, polyurethane, melamine, polytetrafluoroethylene, polypropylene, polyetheretherketone, polyethylene, polycarbonate, polystyrene, or some other food grade material.

This unique dual-chamber design eliminates the need to carry multiple bottles therefore reducing bulk and inconvenience. The container's ergonomic shape ensures a comfortable grip and allow it to fit into standard carrying compartments for portability. The container assembly may be shaped where the average diameter is suitable for insertion into an average cup holder of a vehicle.

In one embodiment, at least one of the container body and the rotatable lid may include at least one ergonomic feature on an exterior surface for facilitating holding or gripping. In one embodiment, the at least one ergonomic feature corresponds to an exterior shape. One of ordinary skill will recognize that alternative geometries may be suitable for use according to the present embodiments. In various embodiments, the container assembly may be a tumbler, cup, mug, or the like. The container assembly may be formed to have a variety of inner volumes including, but not limited to 4 oz., 8 oz., 12 oz., 20 oz., 24 oz., 30 oz., 34 oz., 40 oz., 42 oz., 64 oz., and the like.

In one embodiment, the container assembly comprises a container body. In one embodiment, the container body is a vertically split insulated drinkware product. The container body comprises one or more compartments. In one embodiment, the container body comprises at least two compartments including a first compartment and a second compartment.

In one embodiment, the container assembly further comprises a rotatable lid. In one embodiment, the rotatable lid provides a vacuum sealing to the container body. In another embodiment, the container assembly further comprises a rotatable lid that is secured via a push-on connector or threaded coupling and a gasket fitted rotatable lid, the rotatable lid having two openings each positioned over a separate chamber, and with a means for securing the rotatable lid in a liquid-tight and secure fashion that ensures proper positioning of the rotatable lid openings over each compartment. The rotatable lid allows a user to select a desired drinking percentage of stored liquid from each compartment. In one embodiment, the rotatable lid comprises one or more cavities. In one embodiment, the rotatable lid comprises at least two cavities on both sides configured to rotate the rotatable lid. The cavities are designed to fit the average human fingers in order to rotate the rotatable lid back and forth. In one embodiment, the cavities are configured to allow a user to select the amount of liquid to come out from each compartment. In one embodiment, the rotatable lid further comprises a dispensing opening. The opening is designed for funneled human consumption. In one embodiment, the rotatable lid may include an opening for receiving a drinking straw. In various embodiments, the multifunction lid may include additional features, such as a vent port for allowing pressure equalization and steady flow of the fluid from the vessel. The lid may also include a flange or handle for removing the lid from the vessel.

In one embodiment, the container assembly functions as a mixing chamber. In one embodiment, the container assembly functions as a blender. In one embodiment, the first compartment and the second compartment are made of two different materials. In one embodiment, the container is at least partially made from bamboo or other natural material.

In one embodiment, the container is at least partially made from stainless steel or recycled steel. Other combinations of materials may be used.

In one embodiment, the container assembly comprises one or more additional compartments at its bottom area. In one embodiment, the one or more additional compartments are a slide-out compartment in the container assembly at its bottom area. In one embodiment, the one or more additional compartments are screwed into the container assembly at its bottom area. In one embodiment, the container assembly comprises one or more additional compartments screwed at its bottom area. In one embodiment, the container assembly comprises a storage compartment at its bottom area. In one embodiment, the storage compartment is detachably disposed of at its bottom area. The storage compartment is configured to store one or more items such as keys, credit cards, medications, money, and/or any desired items. In one embodiment, the storage compartment may slide out, flip out, or screw out. In some embodiments, the container assembly further comprises one or more additional compartments. The additional compartments may be threadedly attached to the bottom of the container body. In one embodiment, the container assembly comprises one or more additional compartments at its bottom area capable of holding a hot or cold module for regulating the temperature of one or more of the main body compartments.

In one embodiment, the first compartment has a first upper end and a first lower end. The first compartment further comprises a first opening or first top opening provided at the first upper end. The first compartment is filled via the first top opening. In one embodiment, the second compartment has a second upper end and a second lower end. The second compartment further comprises a second opening or second top opening provided at the second upper end. The second compartment is filled via the second top opening.

In one embodiment, the container body further comprises an insulator provided between the first compartment and the second compartment and between the fluid contained in the container body and the external environment. In one embodiment, the container body further comprises an insulating material, such as a polymer foam. In another embodiment, the container body further comprises an inner vessel and an outer shell, where at least a portion of the outer shell is spaced apart from a portion of the inner vessel. In another embodiment, the container body further comprises the space between the walls is filled with air, an insulating material or both. In other embodiments, the space may be filled with an insulating material, such as a fibrous material, a polymer foam material, or the like. In other cases, the space is vacuum sealed. In one embodiment, the insulator is configured to separate both compartments, thereby allowing the container body to store multiple liquids simultaneously. In one embodiment, the insulator is an air insulation space that separates the compartments physically and thermally. In one embodiment, the liquids in the first compartment and the second compartment are separated by air.

In one embodiment, the container body further comprises a storage compartment at its bottom area. In one embodiment, the storage compartment is detachably disposed of at its bottom area. The storage compartment is configured to store one or more items such as keys, credit cards, medications, money, and/or any desired items. In one embodiment, the storage compartment may slide out or flips out or screws out. In some embodiments, the container body further comprises one or more additional compartments. The additional compartments may be screwed to the bottom of the container body.

The above summary contains simplifications, generalizations, and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and detailed written description.

BRIEF DESCRIPTION OF DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF THE INVENTION

Figure 1:
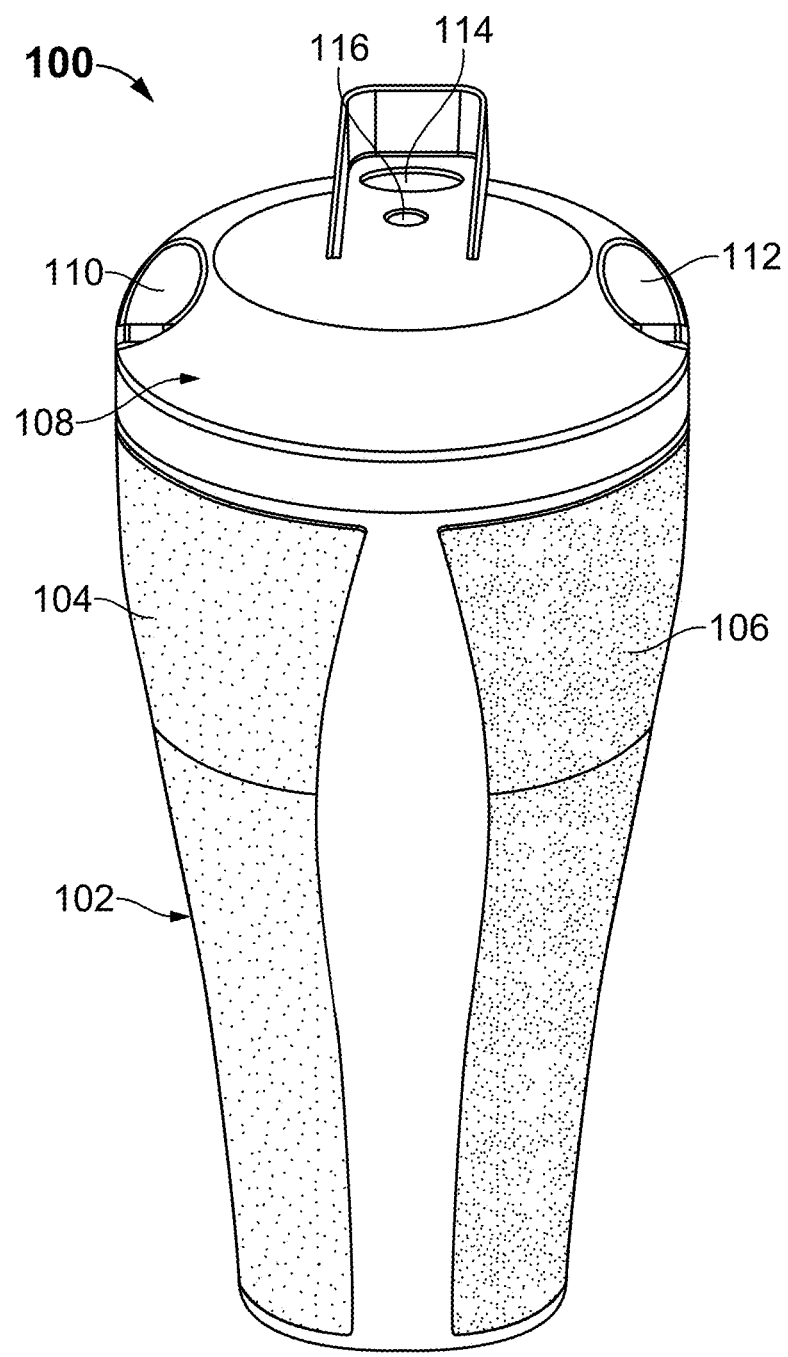
FIGS. 1-2 show different perspective views of a container assembly, according to one embodiment of the present invention.

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Certain terminology is used in the following description for convenience only and is not limiting. The words "right," "left," "upper," and "lower" designate directions in the drawings to which reference is made. The words "inwardly" and "outwardly" refer to directions toward and away from, respectively, the geometric center of the system for use with a consumable beverage and designated parts thereof. The terminology includes the words above specifically mentioned, derivatives thereof, and words of similar import. Additionally, the words "a" and "one" are defined as including one or more of the referenced item unless specifically stated otherwise.

Figure 2:
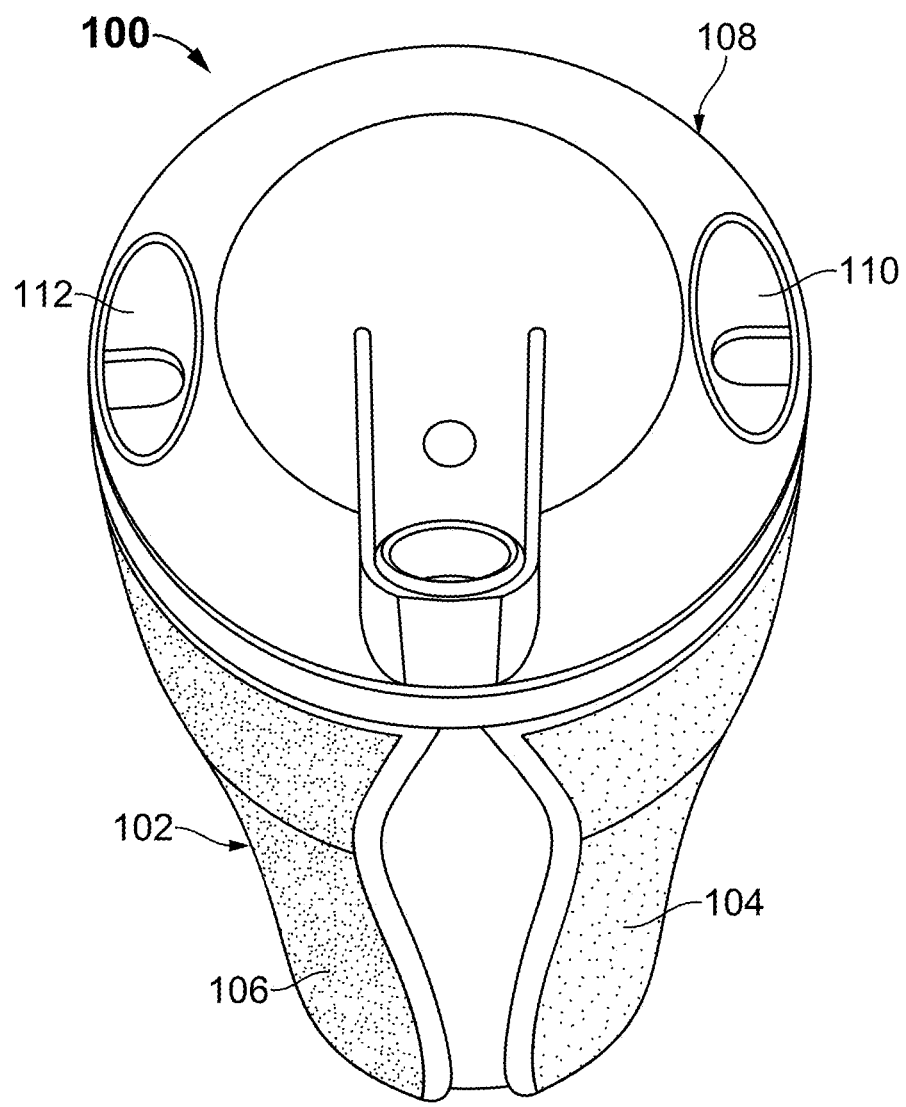

Referring to FIGS. 1-2, different perspective views of a container assembly 100 are illustrated. The container assembly 100 is an innovative and intelligent dual insulated container or drinkware bottle that has been designed to store multiple liquids such as drinkable beverages or foods. The multiple liquids are separately stored in the container assembly 100 at a same time or simultaneously. In one embodiment, the container assembly 100 has the capability to contain both hot and cold liquids simultaneously. In one embodiment, the container assembly 100 has the capability to contain both non-alcoholic and alcoholic beverages simultaneously.

In one embodiment, the container assembly 100 comprises a container body 102. In one embodiment, the container body 102 is a vertically split insulated drinkware product. The container body 102 comprises one or more compartments. In one embodiment, the container body 102 comprises at least two compartments including a first compartment 104 and a second compartment 106.

In one embodiment, the container assembly 100 further comprises a rotatable lid 108. In one embodiment, the rotatable lid 108 provides a vacuum sealing to the container body 102. The rotatable lid 108 allows a user to select a desired drinking percentage of stored liquid from each compartment. In one embodiment, the rotatable lid 108 comprises one or more cavities. In one embodiment, the rotatable lid 108 comprises at least two cavities (110 and 112) on both sides configured to rotate the rotatable lid 108. The cavities (110 and 112) are designed to fit the average human fingers in order to rotate the rotatable lid 108 back and forth. In one embodiment, the cavities (110 and 112) are configured to allow a user to select the amount of liquid to come out from each compartment. In one embodiment, the rotatable lid 108 further comprises a spout 114 and a hole 116. The spout 114 is designed for funneled human consumption. In one embodiment, the rotatable lid 108 is preferably detachably engageable with the container body 102. In another embodiment, the container body 102 and rotatable lid 108 comprise at least one thread positioned generally around a substantial portion of a perimeter of the rotatable lid 108 located to detachably engage mating attachment parts of the container body 102 such at threads or snap-on engagement. In another embodiment, the rotatable lid 108 is attached to the container body 102 via a connector. In one embodiment, the connector may include, but not limited to, a hinge connector, a snap-on connector, and a screw-type connector. In another embodiment, the container body 102 and rotatable lid 108 may be configured for forming at least one hermetic seal for hermetically isolating each of the plurality of cavities (110 and 112) from each other based on the coupling of the container rotatable lid 108 with the container body 102.

In one embodiment, the top side of the container body 102 or rotatable lid 108 or both has a substantially circular periphery In one embodiment, the substantially circular periphery is circular. As used herein, "substantially circular periphery" refers to a rounded shape with at least one-fold reflection symmetry. The periphery may have the shape of an ellipse, a circle, an oval, an egg, or may be a combination of elliptical curves, circular curves, Bezier curves, parabolic curves, a cycloid, or some other curve. For example, one half of the periphery may be a semicircle, while the other half may be a semi-ellipse. In one embodiment, the substantially circular periphery is generally elliptical. In an alternative embodiment, the periphery may have one or more straight edges, or straight edges connected by rounded corners, or the periphery may have no reflection symmetry. Preferably the periphery is a convex shape, though in an alternative embodiment, the periphery may be non-convex.

In one embodiment, the rotatable lid 108 may comprise a polymeric material such as acrylic, nylon, polyurethane, melamine, polytetrafluoroethylene, polypropylene, polyetheretherketone, polyethylene, polycarbonate, polystyrene, or some other food grade plastic. Preferably, the polymeric material is heat stable against hot beverages, meaning that up to temperatures of 110° C., the lid does not degrade and does not deform to an extent that limits its function. In another embodiment, the polymeric material does not degrade or deform when covering a beverage being microwaved. Additionally, where the rotatable lid 108 comprises a thermoplastic polymer, the lid may be formed by press forming, injection molding, vacuum forming, thermoforming, blow molding, rotational molding, 3D printing, or some other fabrication method. In other embodiments, the rotatable lid 108 may comprise stainless steel, glass, ceramic, aluminum, silicone, paper, a thermochromic dye, or other materials. In one embodiment, the rotatable lid 108 may be recyclable and/or compostable.

The container body 102 may be of conical or cylindrical shape. The body may be constructed of various materials including but not limited to plastics (e.g., bisphenol A free plastic), metals (e.g., aluminum or stainless steel), insulating material (e.g., insulating foam or fiber), wood, ceramics, and glass. Advantageously, the material is sufficiently heat resistant, acid-base and corrosion resistant, to be used as a beverage container for human use. A container body 102 made of food grade metal or plastic is preferred. A container body 102 of stainless steel and a rotatable lid 108 of plastic is believed suitable. In one embodiment, the container comprises at least one material with a low thermal conductivity and a high thermal reflectivity. In another embodiment, the at least one material may include aerogel composite materials, silica aerogel composite materials, ceramic fiber materials, metalized films, or similar materials. In another embodiment, the at least one material may include a first layer of material with a low thermal emissivity and a second layer of material adjacent to the first layer of material having a low thermal conductivity. In another embodiment, the at least one material may include reflective foil insulation, aluminized Mylar films, metalized films, metal-coated insulators, ceramic-coated insulators, and the like.

Figure 3:
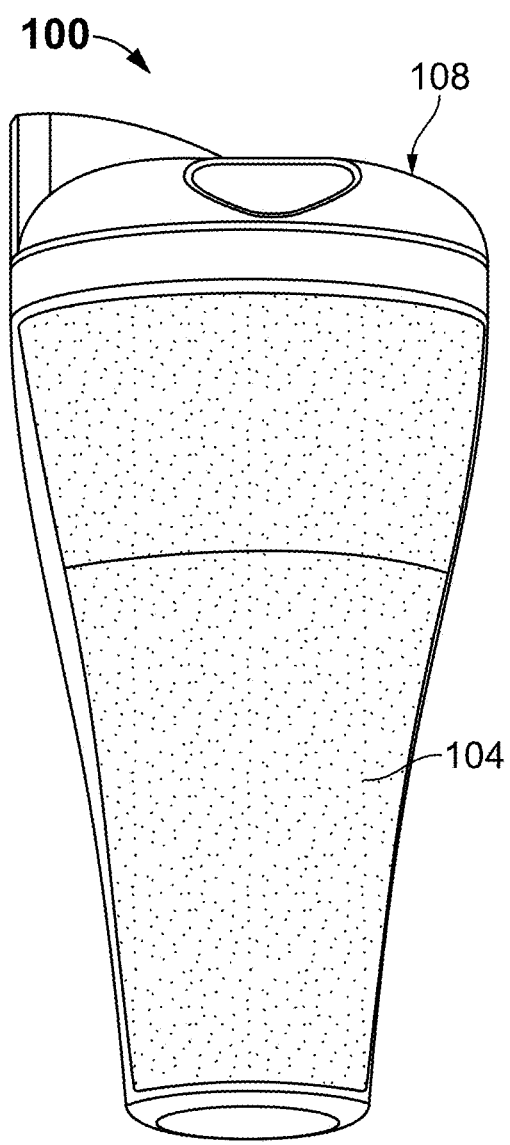
FIGS. 3-4 show side views of the container assembly, according to one embodiment of the present invention.
Figure 4:
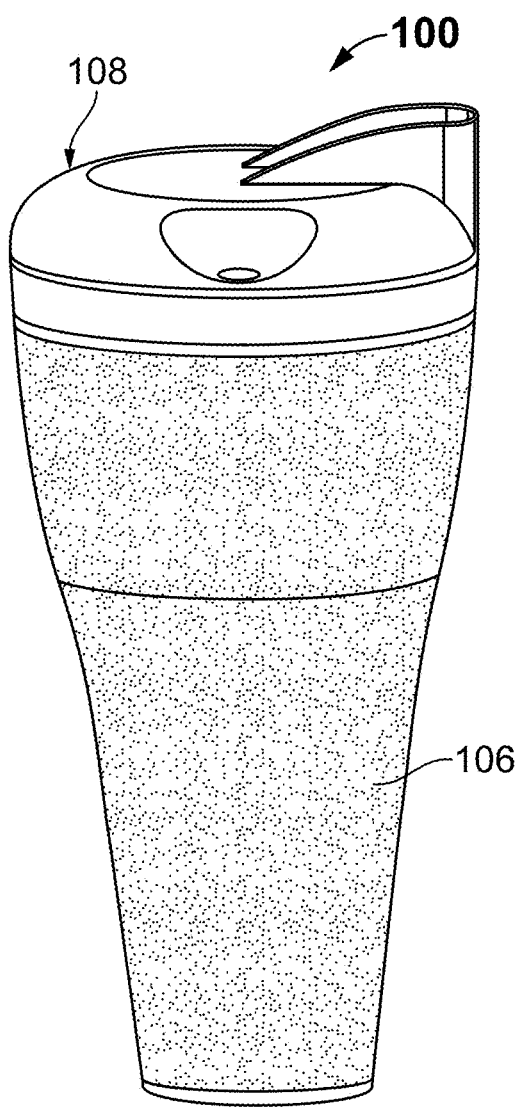

Referring to FIGS. 3-4, different side views of the container assembly 100 are illustrated. In one embodiment, the container assembly 100 functions as a mixing chamber. In one embodiment, the container assembly 100 functions as a blender. In one embodiment, the first compartment 104 and the second compartment 106 are made of two different materials. In one embodiment, the first compartment 104 is made from bamboo. In one embodiment, the second compartment 106 is made from stainless steel or recycled steel. Other combinations of materials may be used.

In one embodiment, the first compartment 104 shows one of the percentage cavities 110 and one side of the spout 114 as well. In one embodiment, the second compartment 106 shows the other one of the percentage cavities 112 and another side of the spout 114 as well. In one embodiment, the container assembly 100 is dishwasher safe and microwave safe. In one embodiment, the container assembly 100 is a long-lasting durable luxury product. The rotatable lid 108 is used for sanitary use and to prevent any leakage. In one embodiment, the rotatable lid 108 provides leakage proof to prevent or stop any leakage of liquids.

In one embodiment, the rotatable lid 108 is turned using the cavities (110 and 112), thereby allowing the user to select the amount of liquid to be dispensed from each compartment (104 and 106) for consumption. For example, the top can be set to dispense 100% of just one compartment. It could be changed to dispense, for example, 10% of liquid from the first compartment 104 and 90% of compartment liquid from the second compartment 106. This could then be dialed-in/changed by the user to whatever they want such as 0:100, 10:90, 20:80, 35:65, 50:50, and so on, including an option for 0:0 such that the first and second compartments are both sealed. For example, the user or consumer wants to drink 100% hot coffee, and 0% of their cold water in the morning OR the consumer can drink 30% vodka with 70% cranberry juice pouring out of the dual spout into their mouths.

Figure 5:
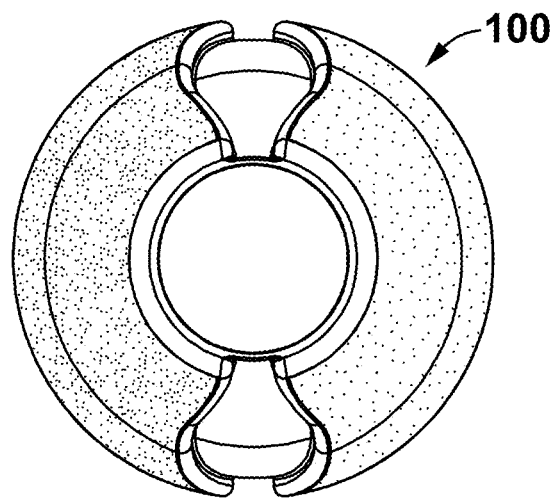
FIG. 5 shows a bottom view of the container assembly, according to one embodiment of the present invention.

Referring to FIG. 5, a bottom view of the container assembly 100 is illustrated. In one embodiment, the container assembly 100 comprises one or more additional compartments at its bottom area. In one embodiment, the container assembly comprises one or more additional compartments at its bottom area. In one embodiment, the one or more additional compartments are a slide-out compartment in the container assembly at its bottom area. In one embodiment, the one or more additional compartments are screwed into the container assembly at its bottom area. In one embodiment, the container assembly comprises one or more additional compartments threadedly attached at its bottom area. In one embodiment, the container assembly comprises a storage compartment at its bottom area. In one embodiment, the storage compartment is detachably disposed of at its bottom area. The storage compartment is configured to store one or more items such as keys, credit cards, medications, money, and/or any desired items. In one embodiment, the storage compartment slide out or flips out or screws out. In some embodiments, the container assembly further comprises one or more additional compartments. In some embodiments, the container assembly 100 further comprises one or more additional compartments. The additional compartments may be threadedly to the bottom of the container body 102.

Figure 6:
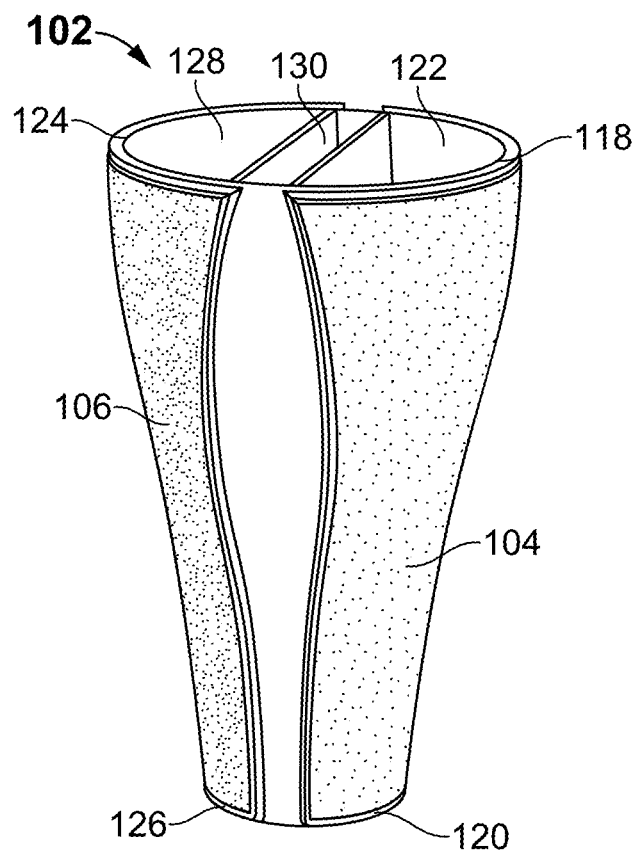
FIG. 6 shows a perspective view of a container, according to one embodiment of the present invention.
Figure 7:
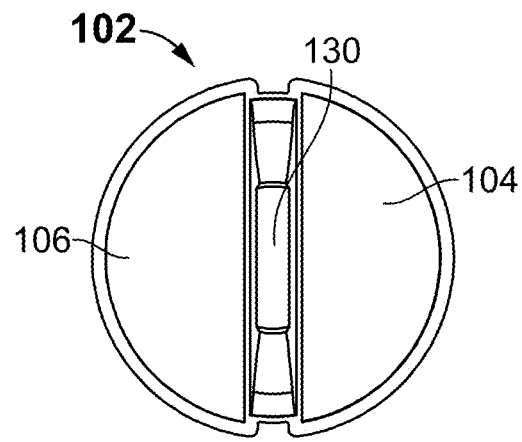
FIG. 7 shows a top view of the container, according to one embodiment of the present invention.

Referring to FIGS. 5-7, different views of the container body 102 are illustrated. In one embodiment, the container body 102 comprises one or more compartments including a first compartment 104 and a second compartment 106. In one embodiment, the first compartment 104 has a first upper end 118 and a first lower end 120. The first compartment 104 further comprises a first opening or first top opening 122 provided at the first upper end 118. The first compartment 104 is filled via the first top opening 122. In one embodiment, the second compartment 106 has a second upper end 124 and a second lower end 126. The second compartment 106 further comprises a second opening or second top opening 128 provided at the second upper end 124. The second compartment 106 is filled via the second top opening 128.

Referring to FIG. 6, the container body 102 for use with consumable liquids includes an upper end 118. While it is preferred that the upper end 118 of the container 102 is generally circularly shaped, those of ordinary skill in the art will appreciate from this disclosure that the upper end 118, as well as the first top opening 122 and the second top opening 128, can have any shape without departing from the scope of the present invention. The first top opening 122 and the second top opening 128 may be of circular, oblong, oblong with curved ends, elliptical, or slightly curved to conform to the periphery of the top of the container body 102.

In one embodiment, the container body 102 further comprises an insulator 130 provided between the first compartment 104 and the second compartment 106. In one embodiment, the insulator 130 is an air insulation space that separates the compartments (104 and 106) physically and thermally. In one embodiment, the liquids in the first compartment 104 and the second compartment 106 are separated by air. The insulator 130 is configured to separate both compartments (104 and 106), thereby allowing the container body 102 to store multiple liquids simultaneously. In one embodiment, the liquids in the first compartment 104 and the second compartment 106 are separated by air. In one embodiment, the insulator 130 is sealed at the top, thereby avoiding any spillage of the liquids into the insulator 130 during use, liquids in the first compartment 104 and the second compartment 106 are separated by air.

Figure 8:
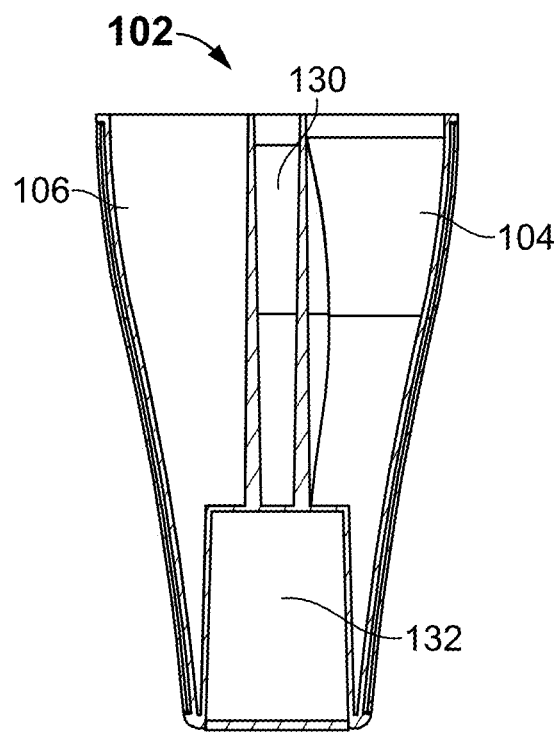
FIG. 8 shows a cut-sectional view of the container, according to one embodiment of the present invention.

Referring to FIG. 8, a cross-sectional view of the container body 102 is illustrated. The container body 102 comprises two compartments including a first compartment 104 and a second compartment 106. In one embodiment, the compartments (104 and 106) are identical. In one embodiment, the container body 102 further comprises a storage compartment 132 at its bottom area. In one embodiment, the storage compartment 132 is detachably disposed of at its bottom area. The storage compartment 132 is configured to store one or more items such as keys, credit cards, medications, money, and/or any desired items. The items slide into the storage compartment 132 in a vertical direction. The insulator 130 slightly slides out without removing the entire bottom that expose the liquid compartments, for the users to store things into the storage compartment 132. In one embodiment, the storage compartment 132 may slide out, flip out, or screw out. In some embodiments, the container assembly 100 further comprises one or more additional compartments. The additional compartments may be screwed to the bottom of the container body 102.

Figure 9:
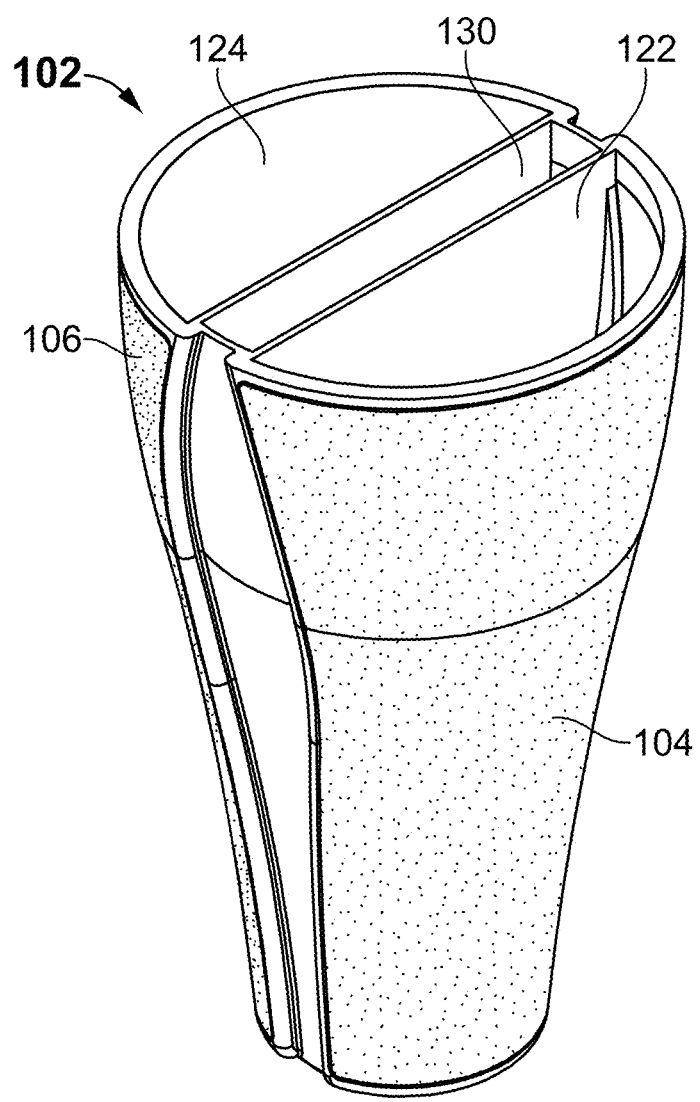
FIGS. 9-10 show different perspective views of the container, according to one embodiment of the present invention.
Figure 10:
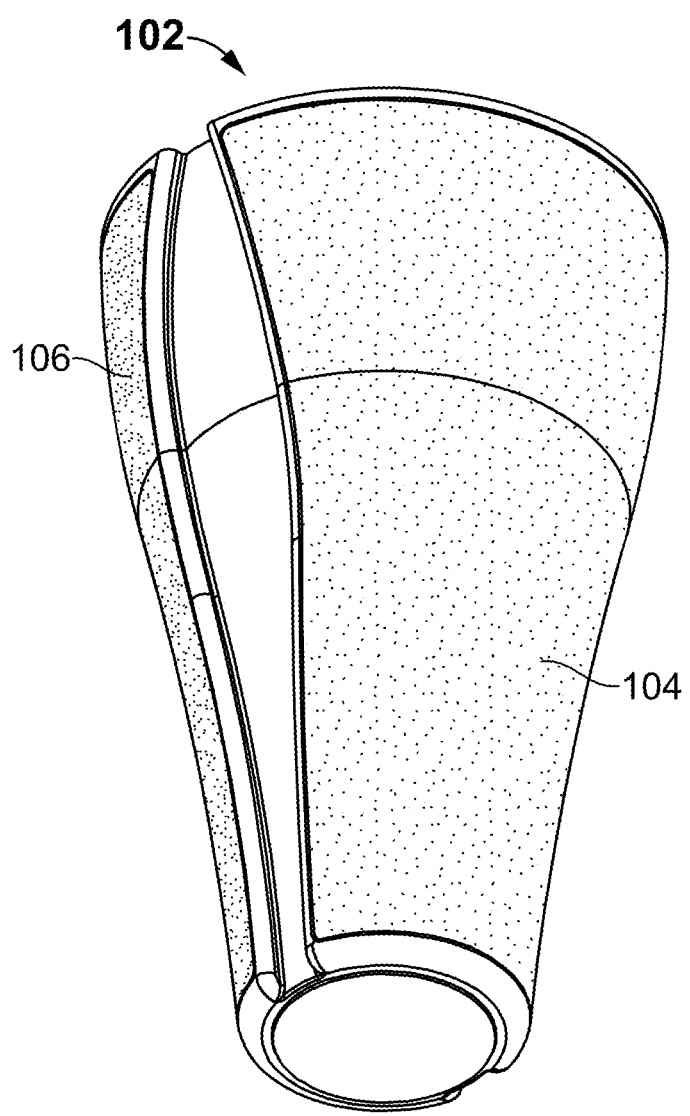

Referring to FIGS. 9-10, different perspective views of the container body 102 are illustrated. The first compartment 104 and second compartment 106 of the container body 102 could keep the cold and hot temperature of the liquid for a minimum of about 12 hours. In some embodiments, the container body 102 is configured to perform an active heating and cooling operation. In some embodiments, the container body 102 is configured with a thermoelectric module for active heating and cooling operation. In some embodiments, the thermoelectric module is a miniature solid state, ceramic thermoelectric heat pump in the form of a module, where the module, when electrically energized, will heat one cavity member and cool the other cavity member. In some embodiments, the container body 102 is configured with an electrical power source, such as a battery, to activate the heating and cooling module. Optionally, thermostats may be included with each cavity member to control operation of the module in heating and cooling a respective cavity member.

In some embodiments, the container body 102 is designed in different sizes and colors. In one embodiment, the container body 102 has logos. The container body 102 is customizable in engraving, colors, and size. In one embodiment, at least a portion of the container body 102 comprises a layer of thermochromic material. In one embodiment, the thermochromic material may be organic leuco-dye mixtures.

In one embodiment, the container body 102 has a dimension of about 254.8 mm in length. In one embodiment, the container body 102 has a dimension of about 77.4 mm in inner diameter (ID) and 149.2 mm in outer diameter (OD). In one embodiment, the container body 102 has a volume of about 16, 24, 32 or more ounces. In one embodiment, each compartment (104 and 106) of the container body 102 has a volume of about 4, 8, 16, 24, 32 or more ounces. In another embodiment, each compartment (104 and 106) of the container body 102 has a volume that is unequal.

Figure 11:
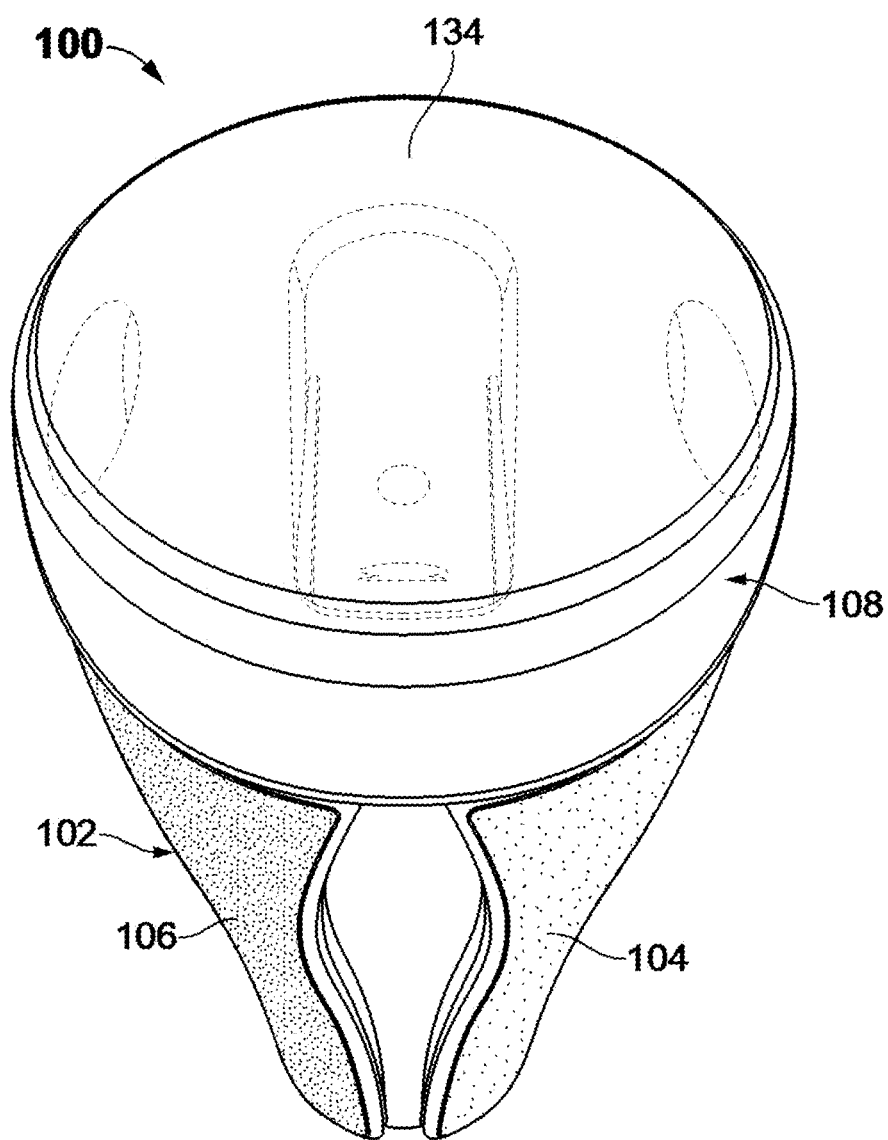
FIG. 11 shows a perspective view of the container assembly with an outer cover, according to one embodiment of the present invention.

Referring to FIG. 11, a perspective view of the container assembly 100 is illustrated. In one embodiment, the container assembly 100 comprises an outer cover 134 positioned over the rotatable lid 108. In one embodiment, the outer cover 134 is attached to the container body 102 configured to enclose the rotatable lid 108 to keep it clean. In one embodiment, the outer cover 134 is attached to the container body 102 via a connector. In one embodiment, the connector may include, but not limited to, a hinge connector, a snap-on connector, and a screw-type connector.

Figure 12:
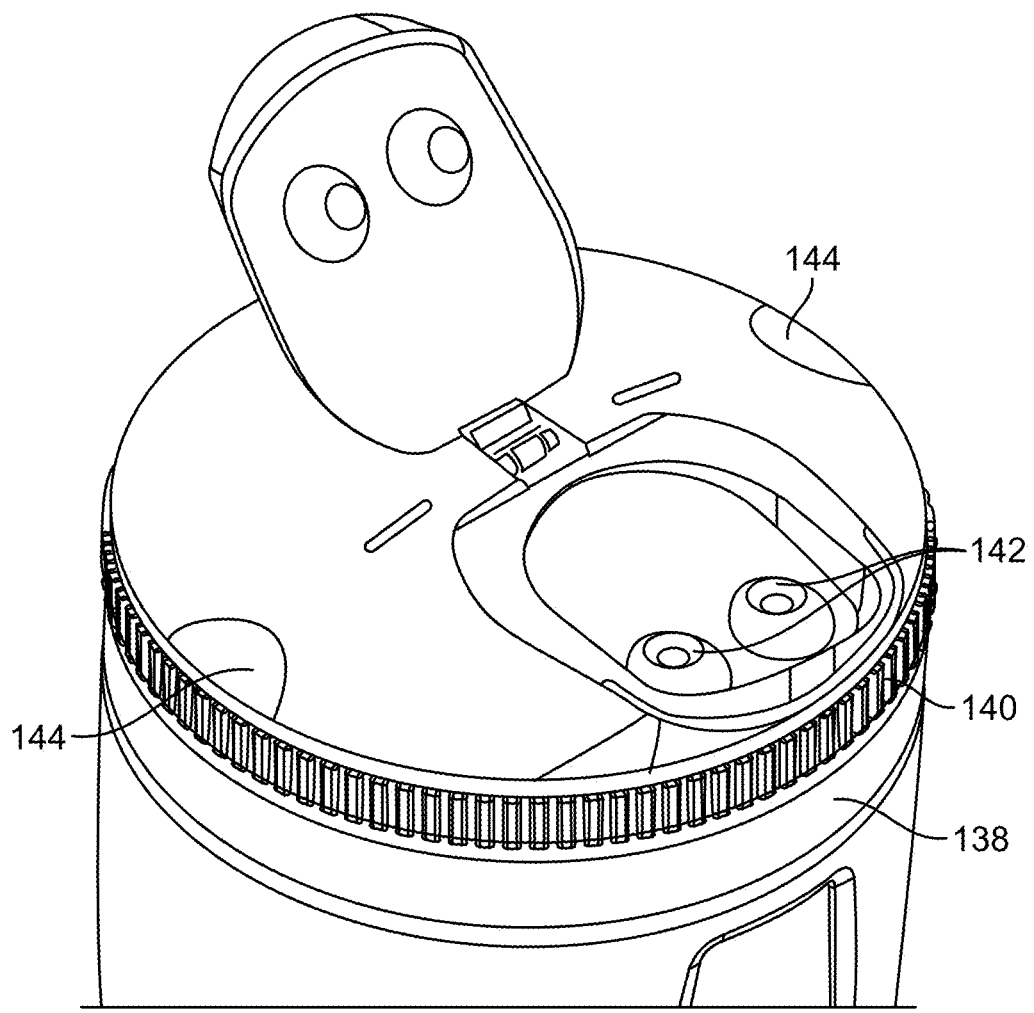
FIG. 12 shows a perspective view of a lid affixed to a container assembly, according to another embodiment of the present invention.
Figure 14:
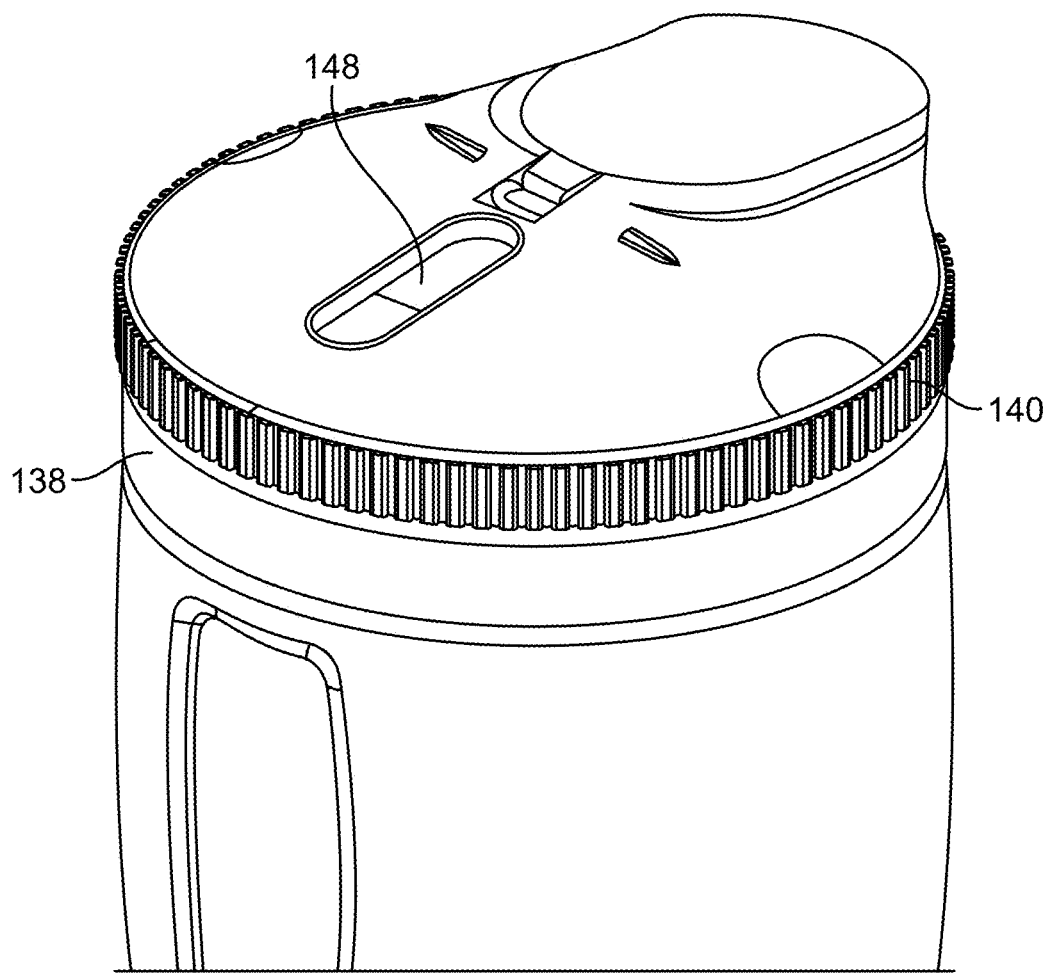
FIG. 14 shows a flow indicator of a container assembly, according to one embodiment of the present invention.
Figure 15:
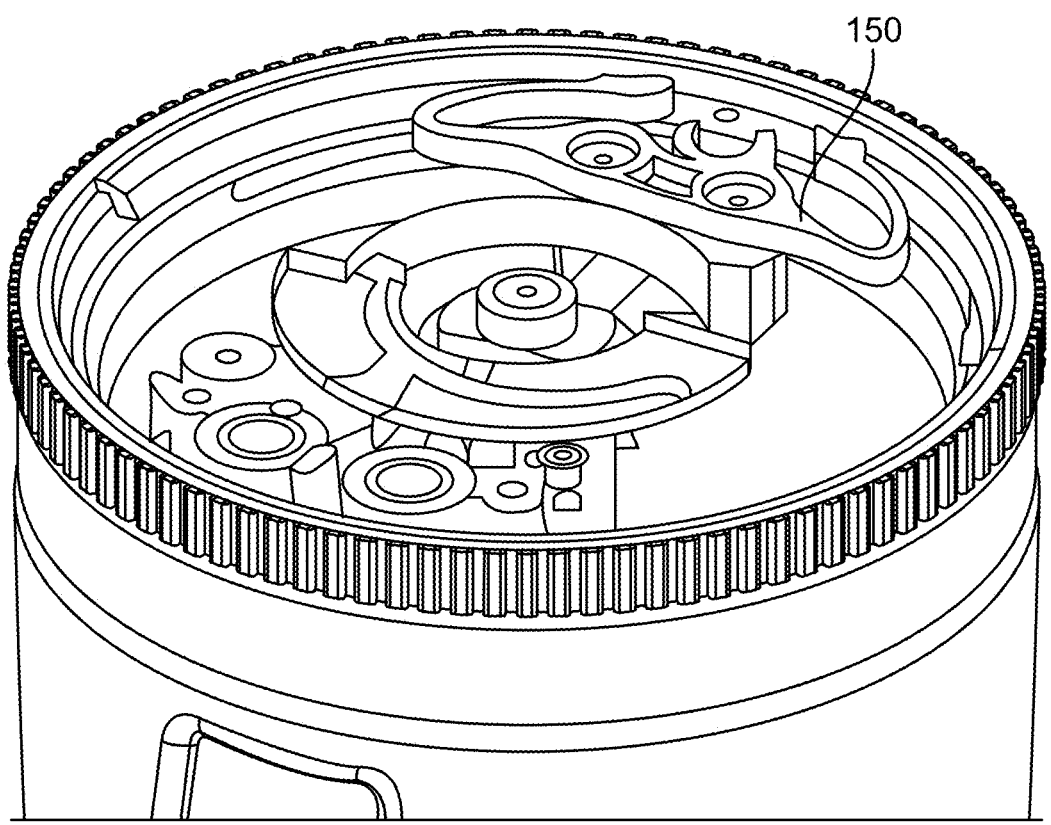
FIG. 15 shows a dial feedback mechanism of a container assembly, according to one embodiment of the present invention.

Referring to FIG. 12 and FIG. 14, the lid 108 comprises a flow indicator 148 configured to show proportion of liquids in the first compartment 104 and the second compartment 106. The first compartment 104 and the second compartment 106 are also referred as compartment (104, 106). The flow indicator 148 displays the ratio of one liquid to the other in the compartments (104, 106). The container assembly 100 further comprises a seal member 138 configured to maintain a vacuum between the container body 102 or outer shell and the compartments (104, 106). The seal member 138 is further configured to seal the lid 108 and the outer shell. The outer shell is designed to fit in standard cup holders and to be comfortably held by small hands. The lid 108 further comprises a flow adjust dial 140 configured to enable the user to adjust the flow of each compartment (104, 106) by turning the flow adjust dial 140. Referring to FIG. 15, further, a dial feedback mechanism 150 delivers a haptic response when adjusting the flow of each compartment (104, 106).

The container assembly 100 further comprises one or more colored indexes 144 to enable the user to identify the liquids in the compartments (104, 106) and the proportional flow of each liquid. The container assembly 100 further comprises a pad disposed at a bottom portion of the container body 102. In one embodiment, the pad is made of rubber material. The rubber pad facilitates noiseless placement of the container assembly 100 and mitigates surface abrasion.

In another embodiment, the container assembly 100 further comprises one or more support members disposed below the compartments (104, 106). The support member is configured to hold the compartments (104, 106) in place and prevent the compartments (104, 106) from contacting one another, and improve heat isolation between the compartments (104, 106). Further, the container assembly 100 comprises a space that divides the outer shell from the inner compartments (104, 106). This space is vacuum-sealed to maintain thermal isolation between the contents of the compartments (104, 106).

The container assembly 100 further comprises support features to strengthen the walls of the compartments (104, 106) and prevent deformation of the compartments (104, 106), which maintains thermal isolation. In one embodiment, the support features are grooves and ridges defined on the compartments (104, 106). The container assembly 100 is further configured to control the flow of liquid in each compartment (104, 106) and mix at the output. The container assembly 100 comprises at least two outlets 142 to enable liquid to exit from the compartment (104, 106), prevent backflow of liquid within the compartment (104, 106), which prevent mixed liquids from returning to the compartments (104, 106).

The container assembly 100 comprises at least one opening at an edge of top portion of each compartment (104, 106) to prevent accumulation of liquid at the opening of the compartment (104, 106), which enables the liquid to exit without any obstruction.

Figure 13:
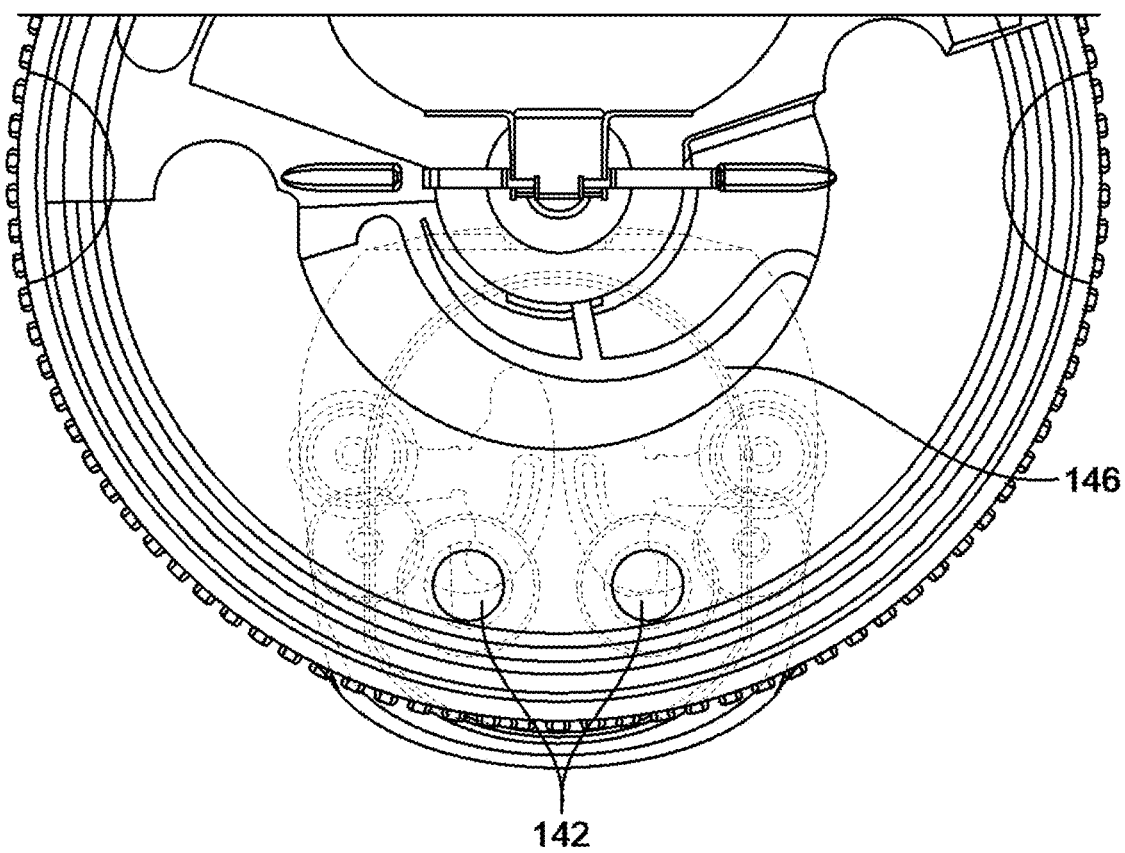
FIG. 13 shows a cam and follower assembly of a container assembly, according to one embodiment of the present invention.
Figure 16:
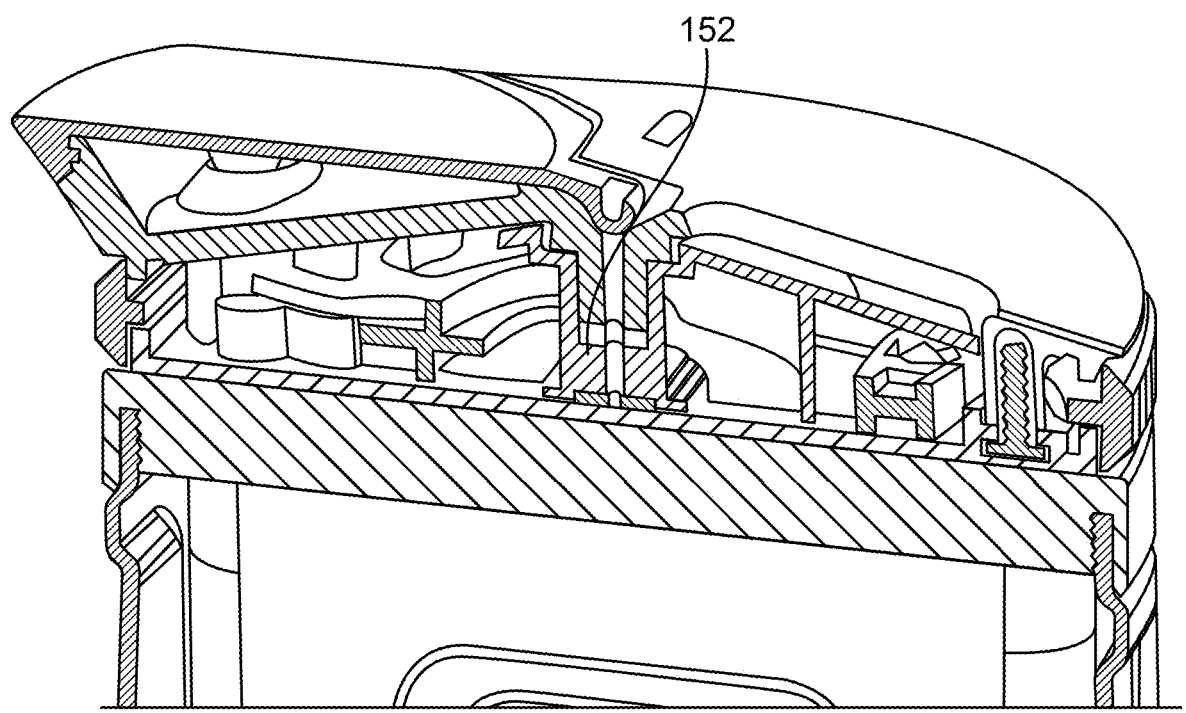
FIG. 16 shows an air vent system of a container assembly, according to one embodiment of the present invention.

Referring to FIG. 13, a cam and follower assembly 146 of the container assembly 100 controls or adjusts the opening and closure of the outlets 142. The container assembly 100 controls the flow of each compartment (104, 106) by restricting the cross-sectional area of the conduits of outlets 142. When one part of the cam and follower assembly 146 moves to close one outlet 142, another part of the assembly 146 moves at the same time to open another outlet 142 to the same degree. This ensures that the outlets 142 are adjusted in a balanced way, maintaining consistent and equal operation of the mechanism. Referring to FIG. 16, the container assembly 100 further comprises an air vent system 152 that allows air to flow through each compartment (104, 106) to maintain a constant and even flow.

Advantageously, the container assembly of the present invention has an ability to contain both hot and cold liquids simultaneously. The container assembly is also designed to have an ability to contain non-alcoholic and alcoholic beverages simultaneously. The top part of the split cup has a lid sealed to prevent leakage. The rotating lid spout allows the consumer to choose what percent of liquid comes out of either side of the container.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure is not limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

The invention claimed is:

1. A container assembly for storing multiple liquids, comprising:
   a container body having a plurality of compartments, including:
      a first compartment having a first upper end, a first opening at the first upper end, and a first lower end;
      a second compartment having a second upper end, a second opening at the second upper end, and a second lower end; and
      a thermal insulator provided between the first compartment and the second compartment configured to separate both of the compartments, thereby allowing the container body to store multiple liquids simultaneously;
      a rotatable lid detachably attached to the upper end of the container body configured to prevent and stop any leakage;
   wherein the rotatable lid is activated to set proportional amount of liquid to be dispensed from each of the compartments; and
   wherein the rotatable lid comprises a flow adjust dial configured to enable the user to simultaneously and proportionally adjust the flow rate and dispensing ratio of both the first compartment and the second compartment by rotating the flow adjust dial, and is configured to selectively align with the first opening associated with the first compartment and with the second opening associated with the second compartment, each of which is in fluid communication with its respective compartment, to regulate the dispensing flow by adjusting the relative alignment of the openings, thereby allowing a user to simultaneously select a desired ratio of liquid dispensable from the first compartment and the second compartment.

2. The container assembly of claim 1, wherein the first compartment and the second compartment are configured to store hot and cold liquids simultaneously.

3. The container assembly of claim 1, wherein the first compartment and the second compartment are configured to store non-alcoholic and alcoholic beverages simultaneously.

4. The container assembly of claim 1, wherein the liquids in the first compartment and the second compartment are separated by a vacuum.

5. The container assembly of claim 1, wherein the container body is made of two or more different materials.

6. The container assembly of claim 1, wherein at least a portion of the compartment body is made from bamboo.

7. The container assembly of claim 1, wherein at least a portion of the compartment body is made from recycled steel.

8. The container assembly of claim 1, wherein the rotatable lid comprises at least one ergonomic feature on an exterior surface for facilitating gripping the rotatable lid.

9. The container assembly of claim 1, wherein the rotatable lid is configured to allow a user to select the ratio of liquid dispensable from each compartment.

10. The container assembly of claim 9, wherein the rotatable lid further comprises a spout configured to provide funneled human consumption from the first and second compartments.

11. The container assembly of claim 1, wherein the rotatable lid is configured for mixing of the liquids dispensable from the first and second compartment in the selected drinking output percentage of stored liquid dispensable from each of the compartments.

12. The container assembly of claim 1, wherein the container body provides vacuum sealing of the compartments within the container body, wherein the vacuum acts as a thermal barrier that prevents heat transfer between the compartments to allow them to remain a different temperatures.

13. The container assembly of claim 1, further comprising a mixing chamber.

14. The container assembly of claim 1, further comprising a blender.

15. The container assembly of claim 1, further comprises one or more additional compartments disposed within the container body.

16. The container assembly of claim 1, wherein the container body further comprises a storage compartment accessible at its bottom to store any desired items.

17. The container assembly of claim 16, wherein the storage compartment is detachably disposed at the bottom of the container body.

18. The container assembly of claim 1, further comprises an outer cover configured to enclose the rotatable lid.

19. The container assembly of claim 1, further comprises at least two outlets to enable liquid to exit from each compartment and a cam and follower assembly are configured to control and adjust the opening and closure of the at least two outlets.

20. The container assembly of claim 1, further comprises a flow indicator configured to show proportion of liquid dispensable from the first compartment relative to the second compartment.

* * * * *